US008887276B2

(12) United States Patent  (10) Patent No.: US 8,887,276 B2
Mraz et al.  (45) Date of Patent: Nov. 11, 2014

(54) SYSTEM FOR PROVIDING A SECURE VIDEO DISPLAY

(71) Applicant: OWL Computing Technologies, Inc., Ridgefield, CT (US)

(72) Inventors: Ronald Mraz, South Salem, NY (US); Jeffrey Menoher, Ridgefield, CT (US); Andrew Holmes, Stamford, CT (US)

(73) Assignee: OWL Computing Technologies, Inc., Ridgefield, CT (US)

( * ) Notice: Subject to any disclaimer, the term of this patent is extended or adjusted under 35 U.S.C. 154(b) by 114 days.

(21) Appl. No.: 13/683,111

(22) Filed: Nov. 21, 2012

(65) Prior Publication Data
US 2014/0139732 A1  May 22, 2014

(51) Int. Cl.
*H04N 7/16* (2011.01)
*H04N 7/01* (2006.01)

(52) U.S. Cl.
CPC ... *H04N 7/16* (2013.01); *H04N 7/01* (2013.01)
USPC .............. 726/22; 380/255; 380/276; 713/150; 713/181

(58) Field of Classification Search
USPC .............. 726/22; 713/150, 181; 380/255, 276
See application file for complete search history.

(56) References Cited

U.S. PATENT DOCUMENTS

| 5,703,562 | A | 12/1997 | Nilsen |
| 6,522,342 | B1 * | 2/2003 | Gagnon et al. ............... 715/716 |
| 8,068,415 | B2 | 11/2011 | Mraz |
| 8,068,546 | B2 * | 11/2011 | Burgess et al. .......... 375/240.26 |
| 2010/0304731 | A1 * | 12/2010 | Bratton et al. .............. 455/420 |
| 2011/0023077 | A1 * | 1/2011 | Simon .......................... 725/134 |

* cited by examiner

*Primary Examiner* — Jason K. Gee
*Assistant Examiner* — Sharif E Ullah
(74) *Attorney, Agent, or Firm* — John S. Economou

(57) ABSTRACT

A system for providing a secure video display using a one-way data link. An input interface for receives a video stream signal. The one-way data link has an input node coupled to receive the input video stream signal and an output node. A processing system is coupled to the output node of the one-way data link and is configured to run a predetermined operating system. In an embodiment, a video display software program operates within the predetermined operating system to process the video stream signal received from the output node of the one-way data link and to provide an output signal for viewing on a display coupled to the processing system. Optionally, the video display program operates within a virtual operating system running within the predetermined operating system. In other embodiments, the video display program may process a video stream signal containing a plurality of different video programs.

25 Claims, 4 Drawing Sheets

SYSTEM FOR PROVIDING A SECURE VIDEO DISPLAY

FIELD OF INVENTION

This invention relates generally to a system for providing a secure video display, and in particular, a system for providing real-time display in a secure location of full-motion video from untrusted sources.

BACKGROUND OF THE INVENTION

The emerging mission requirement to transfer streaming video from untrusted sources across network domains in the low-to-high direction creates a number of security problems. Prevailing security requirements dictate that all data be filtered to reduce threat of embedded malicious software, yet this is particularly difficult to do with real-time video because of the inherent tradeoffs between data filter efficacy (confidence in detection of security violations), time delays (latency), and video resolution (which degenerates with most methods of data sanitization).

It is desirable to display video at full resolution with minimal time delay, while simultaneously protecting the integrity of data in the receiving network from potential malware threats.

Video is often produced and displayed using open-source software; and, increasingly, open-source software tools are available to embed potentially malicious data using methods increasingly difficult to detect. This suggests that the ability to fully filter video data at a CDS (cross domain system) may not be technically feasible or at least quite difficult.

In addition, highly engineered solutions, such as the Owl Computing Technologies Dual Diode, (described in U.S. Pat. No. 8,068,415, the disclosure of which is incorporated herein by reference) provide a direct point-to-point optical link between network domains in the low-to-high direction. The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown in block diagram form in FIG. 1, a first server (the Blue Server) 101 includes a transmit application 102 for sending data across a one-way data link, e.g., optical link 104, from a first network domain coupled to server 101 to a second network domain coupled to server 111. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 11 is only able to receive data from first server 101, since it does not include any transmit circuitry (e.g., an optical emitter comparable to emitter 103.

It is an object of the present invention to provide a system for displaying video at a higher domain network that is received from a lower domain network and which eliminates any threat of data damage from malware which may be included within the received video stream.

SUMMARY OF THE INVENTION

The present invention, in an embodiment, is addressed to a system for providing a secure video display. An input interface receives a video stream signal. A one-way data link has an input node which is coupled to the input interface and an output node. A processing system is coupled to the output node of the one-way data link. The processing system is configured to run a predetermined operating system. A video display software program operating within the predetermined operating system processes the video stream signal received from the output node of the one-way data link and provides an output signal for viewing on a display coupled to the processing system. Optionally, a virtual operating system is configured to run within the predetermined operating system and the video display software program operates within the virtual operating system. Also optionally, an input server may be coupled between the input interface and the one-way data link for receiving a plurality of digital video data stream signals and for generating a multiplexed output signal comprising the received plurality of digital video data stream signals. In this latter configuration, an interface software module may be coupled between the output node of the one-way data link and the processing system. The interface software module may be configured to demultiplex the multiplexed output signal and provide a separate demultiplexed signal for each of the plurality of digital video data stream signals received at the input interface. Finally, as an additional option to this latter configuration, the system may include a plurality of virtual operating systems, one for each of the received plurality of digital video data stream signals and with each of the plurality of virtual operating systems configured to run within the predetermined operating system and each including an associated video display software program operating therein to process an associated of the received plurality of digital video data stream signals.

In one alternative embodiment of the present invention, a system for providing a secure video display is provided which includes an input interface and associated input server for receiving a signal comprising a plurality of video stream signals. A one-way data link has an input node coupled to the output of the input server and an output node. A dedicated processing system is coupled to the output node of the one-way data link. The processing system is configured to run a predetermined operating system. An isolated video display network is coupled to the dedicated processing system. One or more display terminals is/are coupled to the isolated video display network. A video display software program runs on the predetermined operating system for processing the video stream signals received from the output node of the one-way data link and for selectively providing output signals based upon the video stream signals via the isolated video display network to an associated display terminal for viewing thereon. Optionally, a virtual operating system is configured to run within the predetermined operating system and the video display software program operates within the virtual operating system.

In another alternative embodiment of the present invention, a system for providing a secure video display is provided which includes an input interface and associated input server for receiving a signal comprising a plurality of video stream signals. A one-way data link has an input node coupled to an output of the input server and an output node. A dedicated processing system is coupled to the output node of the one-way data link. The processing system is configured to run a predetermined operating system. An isolated video display network is coupled to the dedicated processing system. A display terminal is coupled to the isolated video display network. The display terminal is configured to allow a user to select one of a plurality of video programs for viewing, the plurality of video programs corresponding to the plurality of video stream signals received at the input interface. A video display software program operates within the predetermined operating system for processing the video stream signals received from the output node of the one-way data link and for selectively providing an output signal based upon the received video stream signals and the selected video program, the output signal provided via the isolated video display network to the display terminal for viewing thereon. Optionally, a virtual operating system is configured to run within the predetermined operating system and the video display software program operates within the virtual operating system.

In operation, the video display software program may convert the received video stream signal (or signals) from a first format based upon a first video codec into a second format based upon a second video format. Alternative, the video display program may convert the received video stream signal (or signals) from a first format into a format suitable for transmission on a dedicated video signal interface. The dedicated video signal interface may be HDMI.

A software filter/firewall may be provided between the input interface and the one-way data link. The software filter/firewall may perform IP screening and/or data filtering.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Since potential malware embedded in a video stream must first by transformed into executable form by the display software application, security benefits may be achieved by hardening and/or isolating and/or containing (e.g., with SE Linux policies) the video display software application. Security is achieved by isolating the video display software in its own dedicated computer system or own virtual host operating system and by providing data to the video display software solely through a one-way data transfer system. In this manner, the malware will not be able to communicate outside the dedicated computer system or virtual host operating system, due to the isolation provided by the one-way data transfer system. In addition, when the video display software operates on a virtual host operating system, the malware will not be able to disrupt system operations, other than the video display software, as the virtual host operating system operates separately from other system functionality at the server which receives the video signal. When the video display software operates on dedicated computer system, such system preferably offers no other system functionality, other than the video signal processing function, in order to ensure that no other system operations are disrupted.

Figure 3:
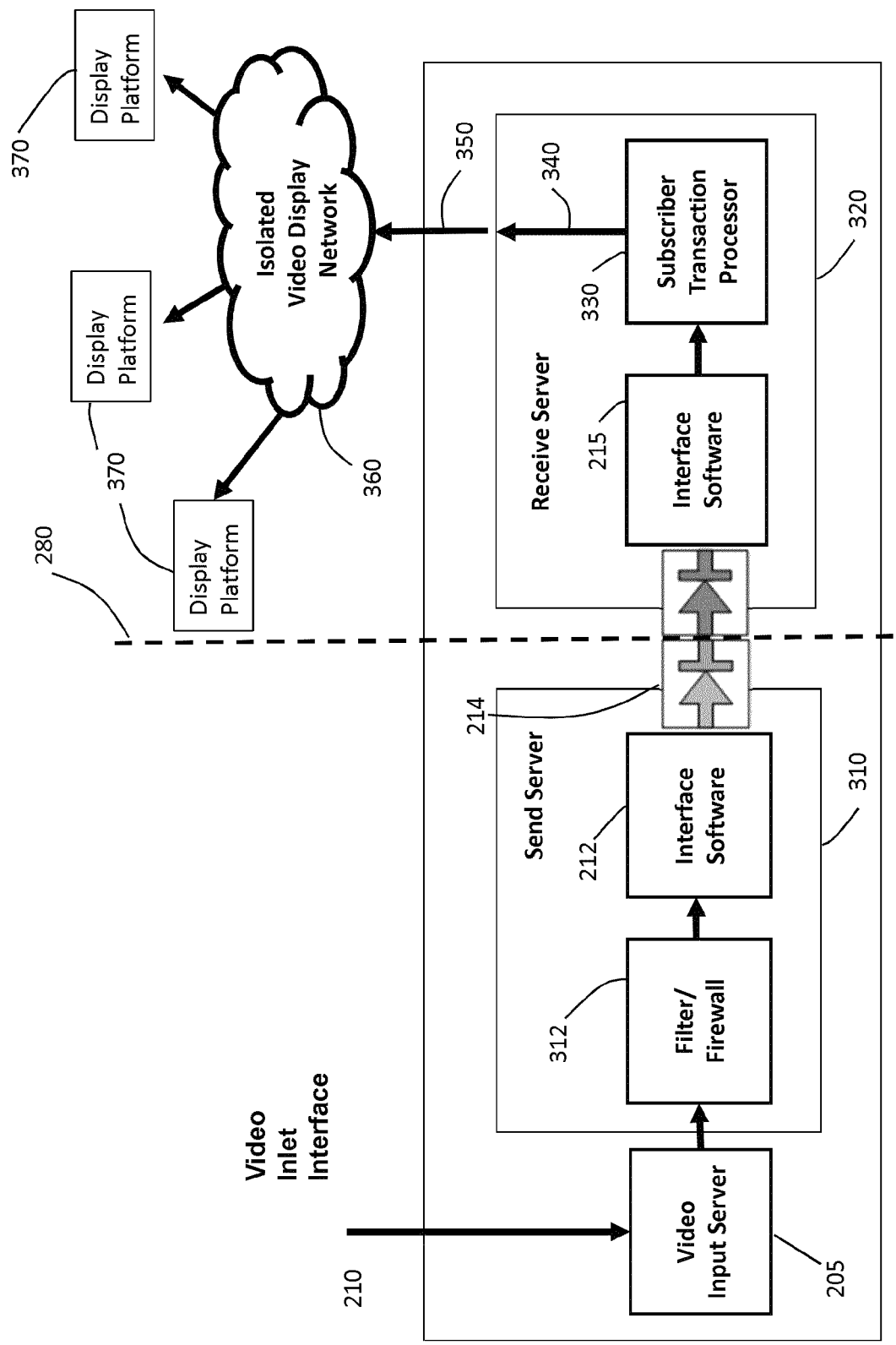
FIG. 3 is a block diagram of an additional embodiment of a secure video display system according to the present invention.
Figure 4:
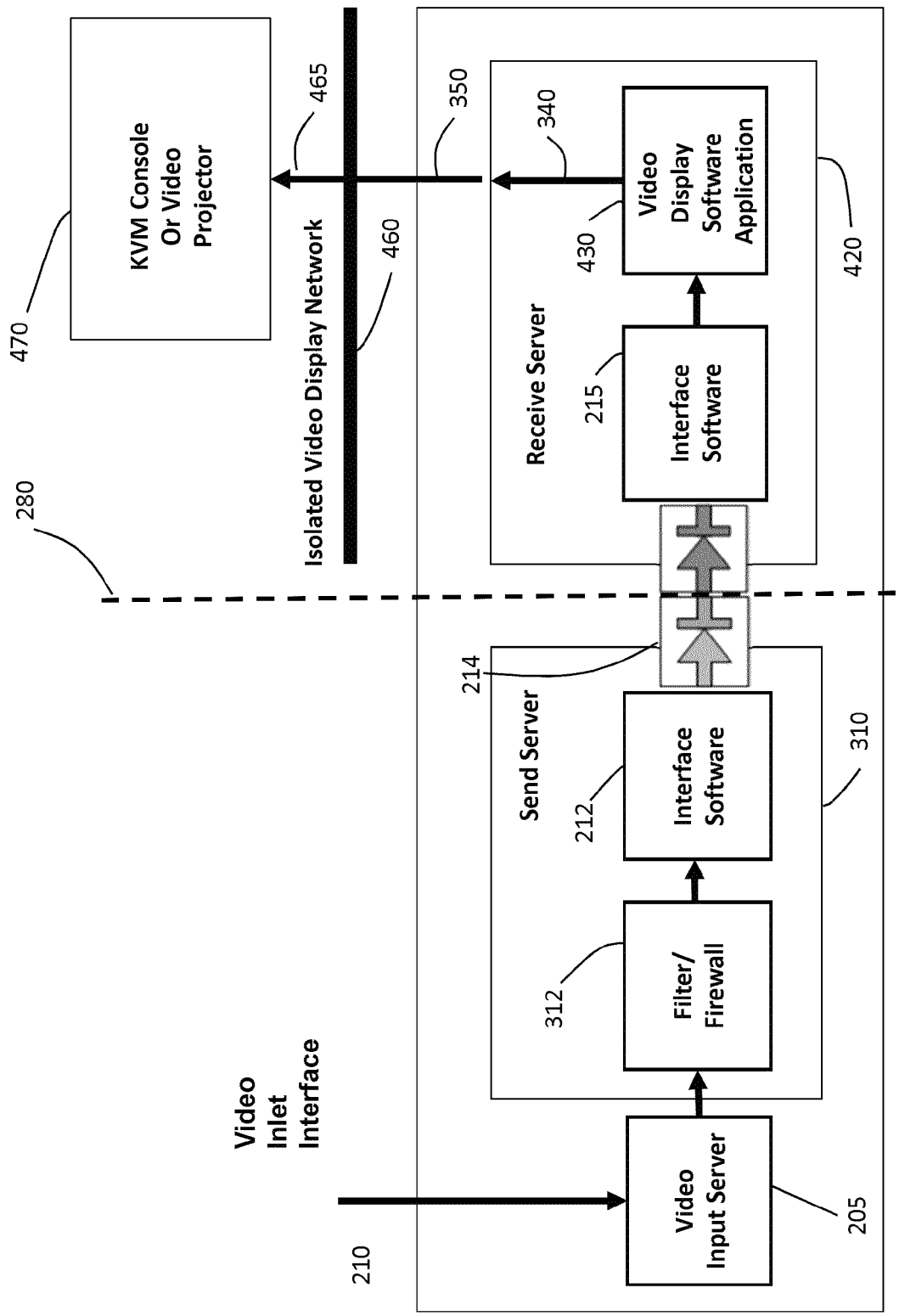
FIG. 4 is a block diagram of a further embodiment of a secure video display system according to the present invention.

The present invention may be configured as a single terminal for viewing a single video channel (FIG. 2), as an isolated video display network for providing distributed streams statically to multiple users on a destination network (FIG. 3), or as an isolated video display network that provides for subscribing to multiple streams simultaneously and selective viewing thereof by a single user (FIG. 4).

Figure 1:
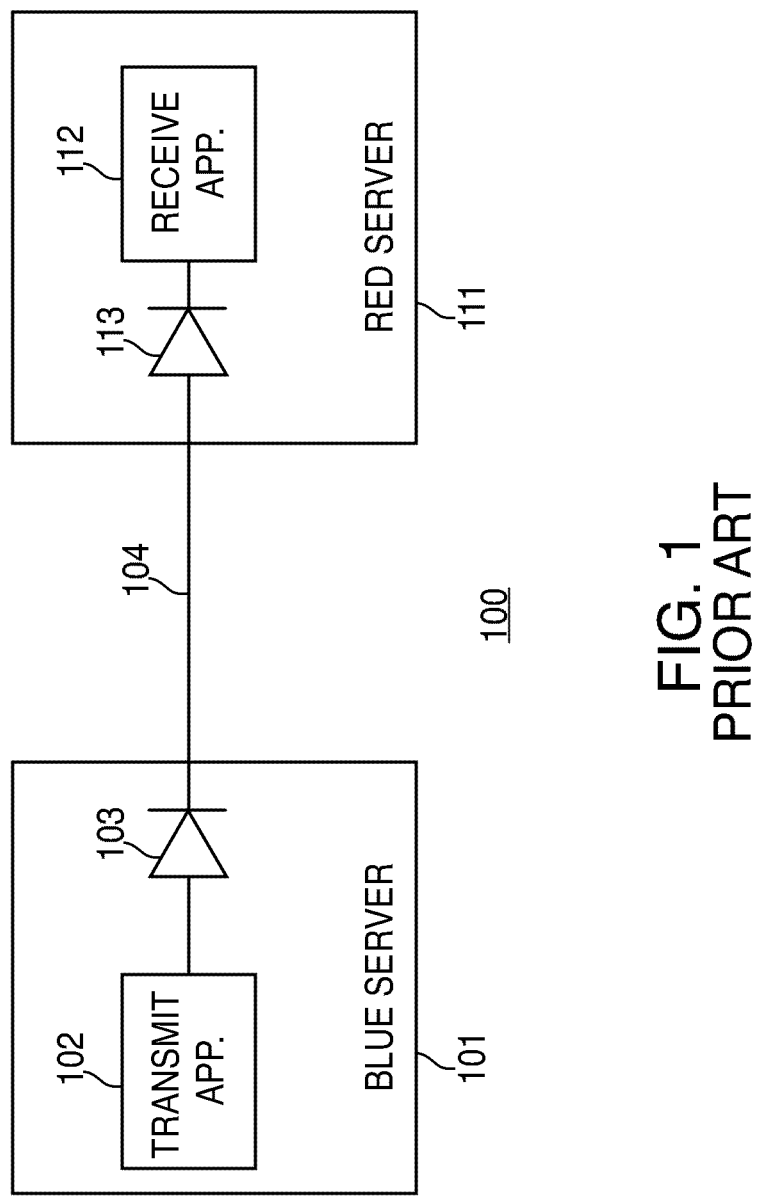
FIG. 1 is a block diagram of a conventional one-way data transfer system.
Figure 2:
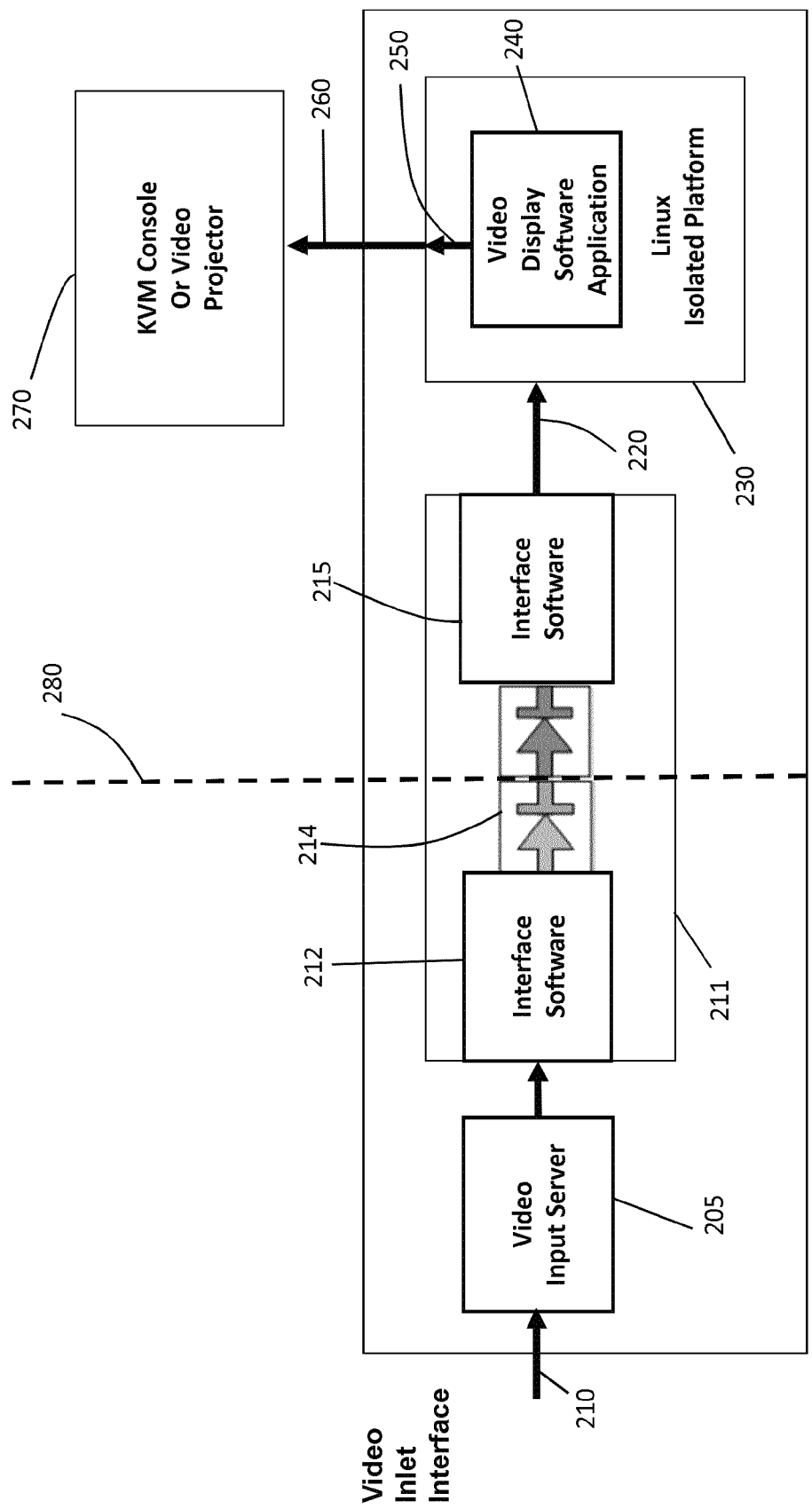
FIG. 2 is a block diagram of an embodiment of a secure video display system according to the present invention.

Referring now to the drawings and in particular to a first embodiment of the invention shown in FIG. 2, the secure video display system 200 preferably includes a video inlet interface 210 for receiving video streams. As discussed herein, although the received video stream is preferably in MPEG format, the present invention is not limited to processing of MPEG video and as one of ordinary skill in the art will readily recognize, the present invention may be used to process video streams in any digital format. Inlet interface 210 is preferably a connection to a network (e.g., LAN), but could also be a direct connection to a particular computer or server. Inlet interface 210 is coupled to video input server 205. Input server 205 is configured to receive, either via a network transmission or a direct transmission, a stream of video data. One of ordinary skill in the art will readily recognize that conventional techniques may be used to transmit, either via a network or direct connection, the video stream to input server 205. One of ordinary skill in the art will also readily recognize that, in the event that a direct connection is provided to a source of the video stream, input server 205 may be omitted. The video input server 205 provides the received digital video stream to unidirectional data interface 211, consisting of blue (send) side interface software 212, a Dual Diode 214 and red (receive) side interface software 215. The unidirectional data interface 211 operates in an identical manner to the Owl Computing Technologies Dual Diode system shown in FIG. 1 and described above. Input server 205 may receive a single stream of video data from a single source or multiple streams of video data from different sources. When multiple streams of video data are received, the video data is multiplexed (either by input server 205 or by interface software 212) to form a single stream of data. At the receive side, interface software 215 may demultiplex the data to separate the streams and provides separate outputs (for each received stream) to each associated video display application 240.

In the embodiment shown in FIG. 2, the output 220 of the unidirectional data interface consists of the received video stream, isolated from the source thereof. Output 220 is provided to a video display software application 240 running on a server 230 having a higher security level than that of the source of the video signal. The video display software application 240 may run on the base operating system of server 230. In the alternative, the video display software application 240 may run within a virtual isolated operating system (e.g., Linux) running within the base operating system of server 230. As one of ordinary skill in the art will readily recognize, although a virtual Linux platform is used in the preferred embodiment shown in FIG. 2, any type of operating system which can run as a virtual environment may be used, so long as there is an associated video display software application available which runs in that operating system and which is capable of processing the types of video signals to be received and viewed by the system 200. In a further embodiment, multiple virtual environments may be provided within server 230, each configured to receive, via a separate connection (actual or virtual), a separate video stream demultiplexed by the interface software 215 and supply a separate output to an associated display device.

The video display software application 240 processes the received video and prepares an output display signal 250, optionally within the virtual (Linux) platform running on server 230. The video display software application running on server 230 provides the output display signal 250 on a link 260 which connected to a display device 270 for viewing by the user. The display device 270 may be a conventional terminal such as a KVM (keyboard, video display, mouse) console used by a user that is attached to the higher domain server, or a video projector or any other type of video display coupled to the higher domain server. When multiple virtual environments are optionally provided within server 230, each is associated with a separate display device coupled to server 230 via an associated link.

The unidirectional data interface 211 ensures that any malware existing within the received video stream will be not be able to send any data from the higher security level server back to the video source server (or any other location). In addition, the video display software application operates on a different platform from the end display device, in effect preventing any malware within the received video stream from disrupting the operation of such end display device. Finally, since the video display software application optionally runs within a virtual platform on the higher security level server 230, any malware existing within the received video stream would not be able to cause any permanent damage to the higher security level server given the virtual aspect of the Linux platform. As one of ordinary skill in the art will readily recognize, even if malware existing within the received video stream were able to disrupt the virtual Linux platform, a simple reboot of that platform would, for example, restore all operating parameters and allow the video server to restart operations. Thus, this embodiment combats malware by isolating the application software from the sources of the video and by providing a virtual environment for the application software.

In a second embodiment shown in FIG. 3, the secure video display system 300 processes multiple streams, as discussed below, for distribution via an isolated display network. In particular, system 300 includes a video inlet interface 210 for receiving video streams (MPEG or other, as discussed above). The digital video stream is provided to a send server 310. The send server 310 includes a software filter/firewall 312, a send-side software application 212 and the transmit side of the Dual Diode 214. Software filter/firewall 312 may perform IP screening and/or data filtering. Send server 310 thus may perform screening and source authentication. As one of ordinary skill in the art will readily recognize, the functionality of filter/firewall 312 may be alternatively provided within input server 205. The receive server 320 includes the receive side of the Dual Diode 214, a receive-side software application 215 and a subscriber transaction processor 330. The subscriber transaction processor 330 is a dedicated processor which runs the video display software application and provides a "protocol break" by translating the received video signal (e.g., a signal based on a first video codec) into a form for display on terminals 370. Such translation may involve conversion from a first video signal type (i.e., based on a first video codec) into a second video signal type (e.g., based on a second, different video codec). In the alternative, the translation could also involve converting the first video signal type (e.g., a digital signal embedded in UDP packets) into a different type of video signal (e.g., a digital video signal for transmission on a non-network interface such as an HDMI cable or equivalent).

Video signal streams received via the interface 210 pass to the filter/firewall 312, then to the send-side software application 212, then through the Dual Diode 214 to the receive-side software application 215 and then to the subscriber transaction processor 330. In this embodiment, receive-side software application 215 may provide the multiplexed video stream signals directly to subscriber transaction processor 330 or may perform the demultiplexing and provide separate stream signals to subscriber transaction processor 330. Video display software operates on the subscriber transaction processor 330 and is capable of processing multiple received streams in real time (received as multiplexed data or as separate streams). Optionally, the video display server may operate in a virtual environment created on the server 320 as described above. The processed video streams are provided to the isolated video display network 360 via the interface 350. Interface 350 may be a general network-type interface or may be a dedicated video-signal only type interface (e.g., a separate HDMI cable for each video signal). One of ordinary skill in the art will readily recognize that other types of video signal interfaces may also be used. Users are able selectively view the desired video streams on terminals 370 coupled to the isolated video display network 360 via interfaces 365. The system 300 receives multiple streams of video data and separately routes each stream to the intended viewer at a display on an associated one of the terminals 370.

In the second embodiment shown in FIG. 3, the video display software is isolated via the Dual Diode 214 and any received malware would be unable to communicate outside the receive server 320, as with the first embodiment. In addition, the video display software operates on a dedicated server in the second embodiment and thus any received malware would be unable to disturb any operations at the receive server other than that of the video display processing and would not interfere with operations of the display terminals 370.

The third embodiment shown in FIG. 4 operates similarly to the system 300 shown in FIG. 3, in that it receives a plurality of video streams via interface 210. However, instead of routing the separate video streams to the associated viewers, system 400 in FIG. 4 includes a dedicated server 420 on which a video display software application 430 is able to selectively process a desired one (as chosen by the user) of the plurality of received video streams and selectively route the processed video signal to the user. Optionally, server 420 may include a virtual environment for running the video display software application 430, in the same manner as discussed above. Interface 350 is coupled to an isolated video display network 460, and a user terminal 470 is coupled to network 460 via an interface 465. The third embodiment provides the same protection against malware as the second embodiment in the same manner, i.e., isolation and operation on a dedicated server.

By rendering and/or converting the video data before providing it the viewer terminal(s), the disclosed embodiments provide an additional level of security by way of an effective protocol break between the received video signal and the distributed video signal. This is effective in providing live, low-latency video data without fear of malware.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for providing secure video display, comprising:
   an input interface for receiving a digital video data stream signal;
   a one-way data link having an input node coupled to the input interface and an output node, the one-way data link configured to transfer data only from the input node to the output node and to prevent any signal from passing from the output node to the input node;
   a processing system coupled to the output node of the one-way data link, the processing system configured to run a predetermined operating system;
   a video display software program for processing the digital video data stream signal received from the output node of the one-way data link and providing an output signal for viewing on a display coupled to the processing system;
   a software filter coupled between the input interface and the one-way data link and configured to perform data filtering of the received digital video data stream signals; and
   wherein the processing system is coupled to the input interface only via the one-way data link and the software filter.

2. The system of claim 1, further comprising a virtual operating system configured to run within the predetermined operating system, and wherein the video display software program operates within the virtual operating system.

3. The system of claim 1, wherein the video display software program converts the received digital video data stream signal from a first format based upon a first video codec to a second format based upon a second video codec.

4. The system of claim 1, wherein the video display software program converts the received digital video data stream signal from a first format into a format suitable for transmission on a dedicated video signal interface.

5. The system of claim 4, wherein the dedicated video signal interface is HDMI.

6. A system for providing secure video display, comprising:
   an input interface and associated input server for receiving a plurality of digital video stream data signals;
   a one-way data link having an input node coupled to an output of the input server and an output node, the one-way data link configured to transfer data only from the input node to the output node and to prevent any signal from passing from the output node to the input node;
   a dedicated processing system coupled to the output node of the one-way data link, the processing system configured to run a predetermined operating system;
   an isolated video display network coupled to the dedicated processing system;
   one or more display terminals coupled to the isolated video display network;
   a video display software program for processing signals received from the output node of the one-way data link and for selectively providing one or more output signals based upon the processed signals via the isolated video display network to one or more associated display terminals for viewing thereon;
   a software filter coupled between the input interface and the one-way data link and configured to perform data filtering of the received digital video data stream signals; and
   wherein the dedicated processing system is coupled to the input interface only via the one-way data link and the software filter.

7. The system of claim 6, further comprising a virtual operating system configured to run within the predetermined operating system, and wherein the video display software program operates within the virtual operating system.

8. The system of claim 6, wherein the video display software program converts the one or more output signals from a first format based upon a first video codec to a second format based upon a second video codec.

9. The system of claim 6, wherein the video display software program converts the one or more output signals from a first format into a format suitable for transmission on a dedicated video signal interface.

10. The system of claim 9, wherein the dedicated video signal interface is HDMI.

11. The system of claim 6, further comprising a software firewall coupled between the input interface and the one-way data link.

12. The system of claim 11, wherein the software firewall is configured to perform IP screening of the received digital video data stream signals.

13. A system for providing secure video display, comprising:
   an input interface and associated input sever for receiving a plurality of digital video data stream signals;
   a one-way data link having an input node coupled to an output of the input server and an output node, the one-way data link configured to transfer data only from the input node to the output node and to prevent any signal from passing from the output node to the input node;
   a dedicated processing system coupled to the output node of the one-way data link, the processing system configured to run a predetermined operating system;
   a display terminal coupled to the dedicated processing system, the display terminal configured to allow a user to select one of a plurality of video programs for viewing, the plurality of video programs corresponding to the plurality of digital video data stream signals received at the input interface;
   a video display software program for processing signals received from the output node of the one-way data link and for selectively providing an output signal based upon the received signals and the selected video program, the output signal provided to the display terminal for viewing thereon;
   a software filter coupled between the input interface and the one-way data link and configured to perform data filtering of the received digital video data stream signals; and
   wherein the dedicated processing system is coupled to the input interface only via the one-way data link and the software filter.

14. The system of claim 13, further comprising a virtual operating system configured to run within the predetermined operating system, and wherein the video display software program operates within the virtual operating system.

15. The system of claim 13, wherein the video display software program converts the output signal from a first format based upon a first video codec to a second format based upon a second video codec.

16. The system of claim 13, wherein the video display software program converts the output signal from a first format into a format suitable for transmission on a dedicated video signal interface.

17. The system of claim 16, wherein the dedicated video signal interface is HDMI.

18. The system of claim 13, further comprising a software firewall coupled between the input interface and the one-way data link.

19. The system of claim 18, wherein the software firewall is configured to perform IP screening of the received digital video data stream signals.

20. A system for providing secure video display, comprising:
- an input interface and associated input server for receiving a plurality of digital video data stream signals and for generating a multiplexed output signal comprising the received plurality of digital video data stream signals;
- a one-way data link having an input node coupled to an output of the input server and an output node, the one-way data link configured to transfer data only from the input node to the output node and to prevent any signal from passing from the output node to the input node;
- an interface software module coupled to the output node of the one-way data link, the interface software module configured to demultiplex the multiplexed output signal and provide a separate demultiplexed signal for each of the plurality of digital video data stream signals received at the input interface;
- a processing system coupled to the interface software module, the processing system configured to run a predetermined operating system;
- a video display software program for processing one of the separate demultiplexed signals received from the interface software module and for providing an output signal for viewing on a display coupled to the processing system;
- a software filter coupled between the input interface and the one-way data link and configured to perform data filtering of the received digital video data stream signals; and
- wherein the processing system is coupled to the input interface only via the one-way data link and the software filter.

21. The system of claim 20, further comprising a virtual operating system configured to run within the predetermined operating system, and wherein the video display software program operates within the virtual operating system.

22. The system of claim 20, further comprising a plurality of virtual operating systems, one for each of the received plurality of digital video data stream signals, each of the plurality of virtual operating systems configured to run within the predetermined operating system, and each including an associated video display software program operating therein to process an associated of the received plurality of digital video data stream signals.

23. The system of claim 20, wherein the video display software program converts the one of the separate demultiplexed signals from a first format based upon a first video codec to a second format based upon a second video codec.

24. The system of claim 20, wherein the video display software program converts the one of the separate demultiplexed signals from a first format into a format suitable for transmission on a dedicated video signal interface.

25. The system of claim 24, wherein the dedicated video signal interface is HDMI.

* * * * *